(12) United States Patent
Chen et al.

(10) Patent No.: US 10,406,870 B2
(45) Date of Patent: Sep. 10, 2019

(54) AUTOMATIC LOCKING DEVICE FOR SNOW SKID CHAINS

(71) Applicants: Lijun Chen, Zhejiang (CN); Yonggang Liu, Zhejiang (CN)

(72) Inventors: Lijun Chen, Zhejiang (CN); Yonggang Liu, Zhejiang (CN)

(*) Notice: Subject to any disclaimer, the term of this patent is extended or adjusted under 35 U.S.C. 154(b) by 151 days.

(21) Appl. No.: 15/700,198

(22) Filed: Sep. 11, 2017

(65) Prior Publication Data

US 2019/0047340 A1  Feb. 14, 2019

(30) Foreign Application Priority Data

Aug. 8, 2017 (CN) .......................... 2017 1 0673305

(51) Int. Cl.
| | |
|---|---|
| *B60C 27/06* | (2006.01) |
| *B60C 27/10* | (2006.01) |
| *B60C 27/12* | (2006.01) |
| *B60C 27/14* | (2006.01) |
| *E05B 15/00* | (2006.01) |
| *E05B 15/04* | (2006.01) |
| *E05B 15/16* | (2006.01) |

(52) U.S. Cl.
CPC .......... *B60C 27/063* (2013.01); *B60C 27/06* (2013.01); *B60C 27/10* (2013.01); *B60C 27/12* (2013.01); *B60C 27/14* (2013.01); *E05B 15/0046* (2013.01); *E05B 15/04* (2013.01); *E05B 15/1635* (2013.01); *E05B 2015/0413* (2013.01); *E05B 2015/1664* (2013.01)

(58) Field of Classification Search
CPC ....... B60C 27/063; B60C 27/14; B60C 27/12; B60C 27/10; B60C 27/06; E05B 15/04; E05B 15/1635; E05B 15/0046; E05B 2015/0413; E05B 2015/1664
USPC .................................................. 152/218, 219
See application file for complete search history.

(56) References Cited

U.S. PATENT DOCUMENTS

| | | | | |
|---|---|---|---|---|
| 2,434,119 A | * | 1/1948 | Nordmark ............... | B60R 22/38 242/382.6 |
| 3,478,981 A | * | 11/1969 | Barecki .................. | B60R 22/38 242/383.3 |
| 6,142,202 A | * | 11/2000 | Hicks ...................... | B60C 27/10 152/218 |
| 6,213,421 B1 | * | 4/2001 | Franklin ............... | B60C 27/066 152/219 |
| 6,619,353 B1 | * | 9/2003 | Kim ........................ | B60C 27/02 152/218 |
| 8,166,616 B2 | * | 5/2012 | Pengg ..................... | B60C 27/10 152/219 |

(Continued)

*Primary Examiner* — S. Joseph Morano
*Assistant Examiner* — Jean W Charleston

(57) ABSTRACT

This invention discloses an automatic locking device for snow anti-skid chains. Wherein the snow anti-skid chain comprises a ratchet wheel lock catch and a anti-skid chain; the anti-skid chain is respectively fixed at the buckle and the outer part of the housing aforesaid, and extends towards three directions. The ratchet wheel lock catch is used to make the anti-skid chain to attach to automobile tires firmly and is controlled by pressing two buttons on its lower side, which is different from existing operational actions of braking off and twisting. The pressing action is simple and available for one hand operation. The overall structure is simple and reliable, conforming to use habits of control actions by users.

8 Claims, 3 Drawing Sheets

(56) References Cited

U.S. PATENT DOCUMENTS

| | | | | |
|---|---|---|---|---|
| 8,720,509 B2* | 5/2014 | Pengg | .................... | B60C 27/10 152/217 |
| 2007/0089823 A1* | 4/2007 | Pengg | .................... | B60C 27/12 152/231 |
| 2007/0199635 A1* | 8/2007 | McCauley | .............. | B60C 27/10 152/217 |
| 2009/0139621 A1* | 6/2009 | Bozkurt | .................. | B60C 27/10 152/218 |

* cited by examiner

AUTOMATIC LOCKING DEVICE FOR SNOW SKID CHAINS

BACKGROUND OF THE INVENTION

This invention relates to the field of tightening devices, and more particularly to an automatic locking device for snow skid chains.

This device is suitable for a tightening device self-possessed by the snow anti-skid chain. The snow anti-skid chain is installed in automobile tires and can effectively prevent the tires to slip during the process of driving on snowfield.

The anti-skid chain includes fast-buckling devices and corresponding anti-skid chains. At the time of installation, the chain is fastened to the car tires by the fastening function of the fast-buckling device. There are also some anti-skid chain fast-buckling devices in international and domestic markets currently.

However, these buckle devices have a variety of defects. Specifically, the operation methods of these devices are not convenient, causing the anti-skid chain to be inconvenient for installing, putting away and releasing; the self-adjusting function for the degree of tightness of the anti-skid chain is unable to be achieved, leading to safety risks caused by loose anti-skid chains in the process of driving of vehicles.

As drivers are paying more and more attention to the safety cost, drivers and automobile manufacturers put a higher demand for the use of the snow anti-skid chain. The anti-skid chain that can be installed, put away and released quickly has gained increasing attentions.

BRIEF SUMMARY OF THE INVENTION

In view of the above deficiencies of existing technologies, it is an object of this invention to provide an automatic locking device for a snow skid chain, which is intended to solve the problem that the snow anti-skid chain, produced according to existing technologies, is not easy to put away and release and unable to adjust the degree of tightness.

In order to achieve the above object, this invention adopts the following technical scheme:

An automatic locking device for snow skid chains and it is composed of following components.

A housing. It includes the first and the second spindle set perpendicular to the bottom of the housing;

Energy storage elastic members set into the first spindle;

A rotation ratchet wheel. Limit-position teeth and positioning teeth are respectively on its edge, and axle hole is set in its center for the passing through of the first spindle;

A locking buckle. It is provided with a through hole adapted to the second spindle, and one of its end further comprises a fixed tooth that engages with the limit-position tooth to restrict the forward rotation of the rotation ratchet wheel;

A release button. Its one end is against one end of the locking buckle that stays away from the fixed tooth. The locking buckle is driven to separate from the rotation ratchet wheel with the downward pressing of the release button;

A rotary buckle. It is linked with the end of the release button, and is jammed and stopped in the positioning tooth with the downward pressing of the release button to limit the reverse rotation of the rotation ratchet wheel.

A release limit-position buckle. It is linked with the release button. When the release limit-position buckle is pressed downward, the release button is driven to reset.

Optionally, the limit-position tooth is set at the upper half of the rotation ratchet wheel in the axial direction, the positioning tooth is set at the lower half the rotation ratchet wheel in the axial direction, and a groove is formed between the limit-position tooth and the positioning tooth.

Optionally, the bottom of the release button is connected with the rotation ratchet wheel through the first compression spring.

The top end of the rotary buckle is connected with the bottom of the release button through the second compression spring.

Optionally, the locking buckle includes the first end away from the rotation ratchet wheel and the second end opposite to the first end. The second end and the end opposite to the rotation ratchet wheel are set with the fixed tooth. The other side of the second is connected with the housing through head springs.

The through hole is set between the first end and the second end to make the locking buckle rotate around the second spindle.

Optionally, the energy storage elastic member stated is a energy storage spring hooked by buckles; both ends of the energy storage spring are against the inner wall of the first spindle and the axle hole, respectively, (the other end is against the internal part of the rotation ratchet wheel).

Optionally, the housing includes an upper case and a lower case and these two cases are fixed and connected to each other by riveting columns. The second spindle is the riveting column;

The housing forms a steel cable outlet in the direction of the horizontal tangent of the rotation ratchet wheel.

Optionally, seal rings are set into the release limit-position buckle and the release button.

Optionally, the steel cable is also included;

One end of said cable is fixed in a groove of the rotation ratchet wheel and is wound in the groove with rotation of the rotation ratchet wheel; and the other end of said cable extends out from said cable outlet.

This invention can be applied to snow skid-resistant chains, but not limited to the application. If used, the snow skid-resistant chain includes the ratchet wheel lock catch, the buckle, the cable jacket and the anti-skid chain aforesaid. The cable jacket is set outside the steel cable outlet;

The steel cable passes through the cable jacket and is fixed in the buckle. The cable jacket is waterproof. The anti-skid chain is connected to the ratchet wheel lock catch.

An application of ratchet wheel lock catch as described above in the automatic tightening of a flexible connector (such as the skid-resistant chain).

Advantageous effects. For the automatic locking device for the snow anti-skid chain provided by this invention, the ratchet wheel lock catch is suitable for quick installation of vehicle snow chains. As the size of the overall lock catch structure is small, there is no need to remove gloves to operate. The user can use one hand to hold the button switch to operate, improving the operational efficiency and the accuracy of the operation. Self-adjusting the degree of tightness of the snow anti-skid chain and length correction of the chain can be realized. The buckle device as a whole is convenient to put away.

DETAILED DESCRIPTION OF THE INVENTION

This invention provides an automatic locking device for a snow anti-skid chain. The lock catch is equipped with a locking device for automatically adjusting the length and the degree of tightness. This invention will be further described in a detailed way by referring to the attached figures and giving embodiment as a way to make its purpose, technical programs and effects more clear and definite. It shall be understood that the specific embodiment stated herein is only used to explain this invention, but not to limit this invention.

Figure 1:
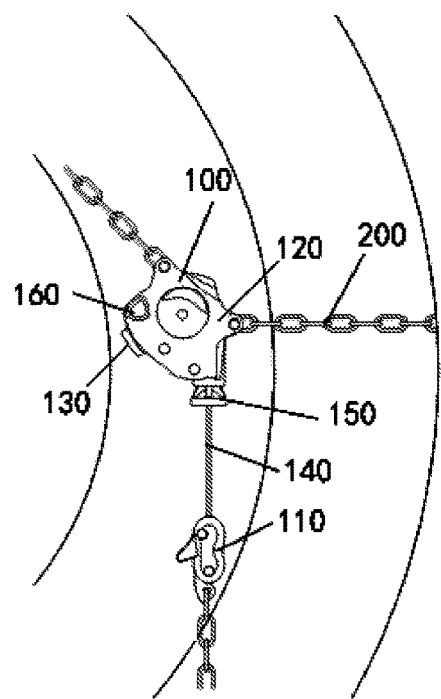
FIG. 1 is an application scenario diagram of the skid-resistant chain of a particular embodiment of this invention.

As shown in FIG. 1, it is a specific embodiment of the automatic locking device for the snow anti-skid chain. And the automatic locking device includes following components.

Ratchet wheel lock catch 100 and anti-skid chain 200. There are multiple of the anti-skid chains which are fixed at the outer part of the buckle 110 and the anti-skid chain 200 aforesaid, respectively, and extend in three directions.

During actual use, the user may press the release button 130 to pull the buckle 110 outwardly and release the buckle when the desired distance is reached. The buckle 110 may be secured in the current position. Then, press the release button 160, the ratchet wheel lock catch 100 retracts the cable 140 secured thereto, and the cable 140 drives the buckle 110 to be retracted to achieve a tightening effect and make the anti-skid chain tightly against the automobile tires.

The ratchet wheel lock catch 100 may also include a cable jacket. The cable jacket 150 is provided outside the cable outlet. The steel cable passes through the cable jacket and is fixed in the buckle. The setting of the cable jacket to prevent the buckle to hit the user's fingers when the buckle is put away and buffer the impact force caused by putting away the buckle. The buckle 110 can be combined by a part 111 and a part 112, and fixed by a riveting column 113. The riveting column can play the role of hanging and holding.

In the embodiment, the ratchet wheel lock catch 100 may be made of plastic or other different types of metal.

Figure 2:
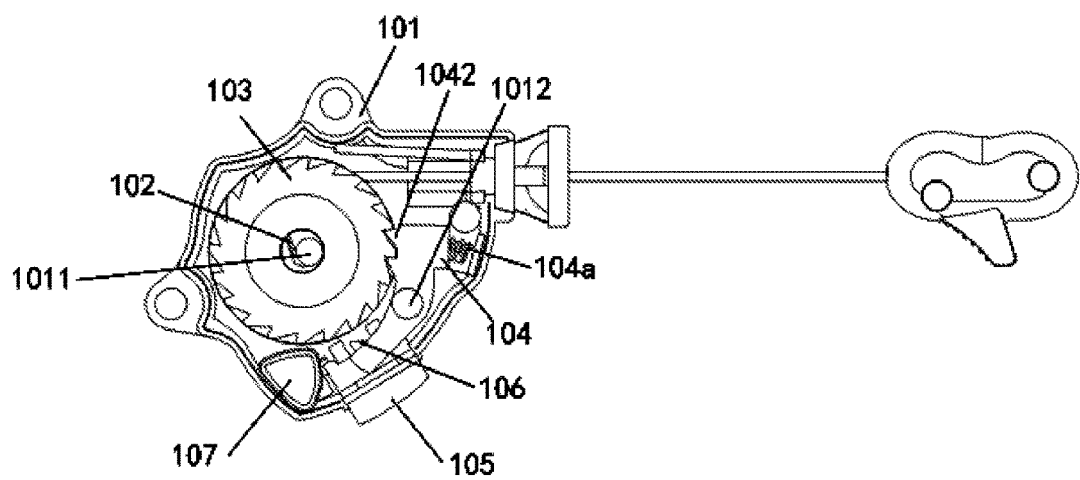
FIG. 2 is a structural diagram of the ratchet wheel lock catch of a particular embodiment of this invention.

FIG. 2 is a structural diagram of a ratchet wheel lock catch provided by an embodiment of this invention. As shown in FIG. 2, the ratchet wheel lock catch includes, in particular, a housing 101, an energy storage elastic member 102, a rotation ratchet wheel 103, a locking buckle 104, a release button 105, a rotary buckle 106, and a release position-limit buckle 107.

Among that the housing 101 includes a first spindle 1011 and a second spindle 1012 set perpendicular to the bottom of the housing. The energy storage elastic member 102 is provided on the first spindle 1011.

Figure 3:
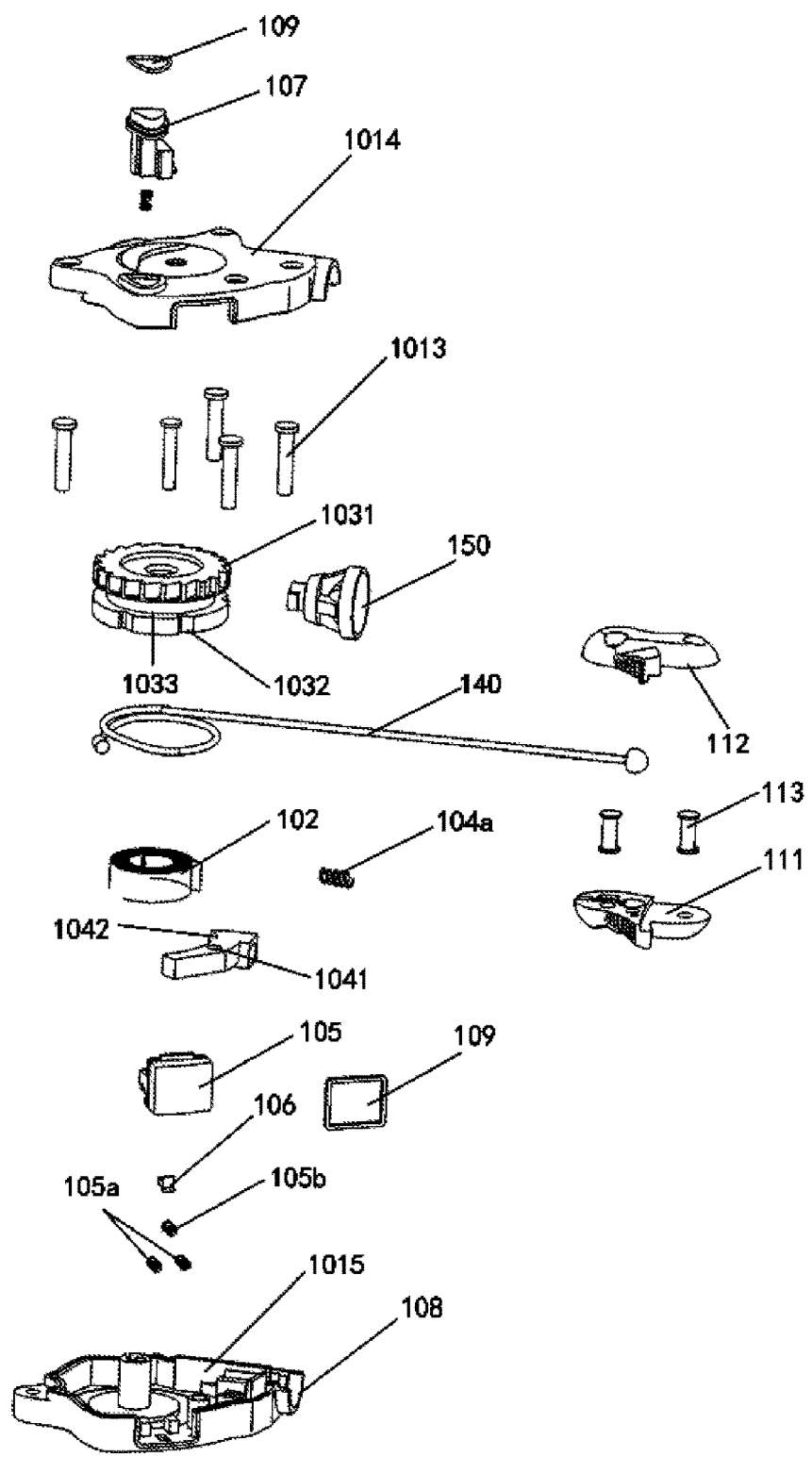
FIG. 3 is a breakdown structure diagram of the ratchet wheel lock catch of a particular embodiment of this invention.

As shown in FIG. 3, the edge of the rotation ratchet wheel 103 is provided with a limit-position tooth 1031 and a positioning teeth 1032, respectively. The center of the rotation ratchet wheel is provided with an axle hole 1033 for the passing through of the first spindle 1011, so as to make the rotation ratchet wheel rotate along the first spindle.

The locking buckle 104 is provided with a through hole 1041 adapted to the second spindle, and one of its end further comprises a fixed tooth 1042 that engages with the limit-position tooth to restrict the forward rotation of the rotation ratchet wheel;

One end of the release button 105 is against one end of the locking buckle that stays away from the fixed tooth. The locking buckle is driven to separate from the rotation ratchet wheel with the downward pressing of the release button and make the rotation ratchet wheel rotate in the forward direction.

The rotary buckle 106 is linked with the end of the release button 105, and is jammed and stopped in the positioning tooth with the downward pressing of the release button to limit the reverse rotation of the rotation ratchet wheel and make the energy storage spring held in compression status.

The release limit-position buckle 107 is connected with the release button 105. The downward pressing of the former rives the latter to reset. Aster the reset, the rotary buckle 106 is withdrawn and the rotation ratchet wheel rotates to put away the steel cable driven by the energy storage spring.

Figure 4:
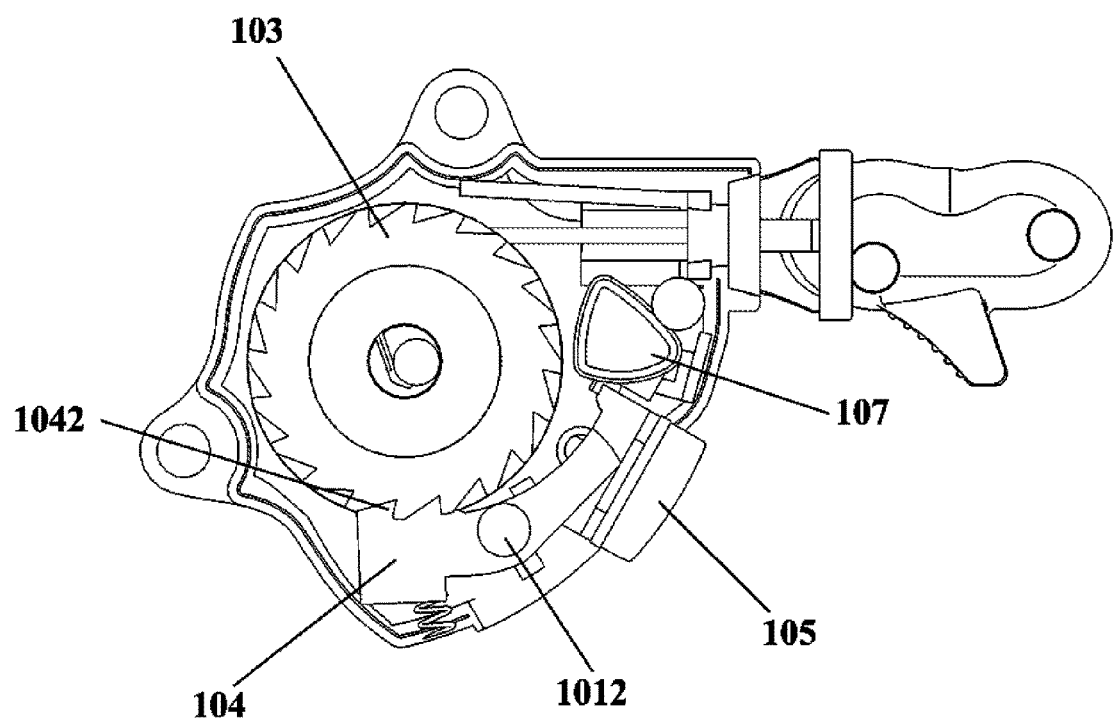
FIG. 4 is a structural diagram of the ratchet wheel lock catch of another particular embodiment of this invention.

In other embodiment, mirror image adjustments can be made for the position of the release limit-position buckle, the release button and the locking buckle in the ratchet wheel locking buckle. FIG. 4 is a structural diagram of the ratchet wheel lock catch provided by another embodiment of this invention.

As shown in FIG. 4, the release limit-position buckle and the release button are provided on the other side which is symmetrical along the axis. Correspondingly, the fixed tooth of the locking buckle hooks up the rotation ratchet wheel to restrict its forward rotation. Of course, technical personnel in the field can adjust the position of each structural component in the ratchet wheel lock catch according to the actual situation and based on operation principles disclosed in the embodiment of the present invention.

Specifically, as shown in FIG. 3, the locking buckle 104 includes a first end and the second end opposite to the first end. The second end is provided with the fixed tooth 1042 on the side opposite to the rotation ratchet wheel, and the other side of the second end is connected with the housing through the head spring 104a.

The through hole 1041 is set between the first end and the second end, so as to make the locking buckle rotate around the second spindle. The head spring 104a, when under a tightened state, can make the fixed tooth 1042 to engage with the rotation ratchet wheel.

FIG. 3 is a breakdown structure diagram of the ratchet wheel lock catch provided by the embodiment of this invention. As shown in FIG. 3, in some embodiment, the housing 101 includes an upper case 1014 and a lower case 1015.

The upper and lower casings are fixed and connected to each other by riveting column 1013. The second spindle is one of the riveting columns. The housing forms a steel cable outlet 108 in the direction of the horizontal tangent of the rotation ratchet wheel. The number of the riveting column 1013 is 5 set in the embodiment.

Preferably, as shown in FIG. 3, the outer portion of the housing may also be provided with the pattern and the circular cove which may be capable of slip resistance when users hold it.

Specifically, the limit-position tooth 1031 is set at the upper half of the rotation ratchet wheel in the axial direction, the positioning tooth 1032 is set at the lower half the rotation ratchet wheel in the axial direction, and a groove 1033 is formed between the limit-position tooth and the positioning tooth.

One end of said cable is fixed in a groove of the rotation ratchet wheel and is wound in the groove with rotation of the rotation ratchet wheel; and the other end of said cable extends out from said cable outlet 108.

In some embodiment, as shown in FIG. 3, the bottom of the release button 105 is connected with the rotation ratchet wheel through the first compression spring (namely, the reset spring of the release button) 105b. The top end of the rotary buckle 106 is connected with the bottom of the release button through the second compression spring (namely, the compression spring of the rotary buckle) 105a.

The release button and the rotary buckle, after applying the setting of above compression springs, have the function of automatic reset. The former and the latter are able to move relatively, and the rotary buckle can move inside the release button.

Specifically, as shown in FIG. 3, the energy storage elastic member 102 may be a snap-fit spring. The energy storage spring present a crimp shape with both end against the first spindle and the inner wall of the ratchet wheel. The initial state of the spring is relaxing and tightened as the forward rotation of the rotation ratchet wheel. In addition, the spring can tighten the steel cable by driving the rotation ratchet wheel to rotate reversely.

Preferably, as shown in FIG. 3, the release limit-position buckle and the release button are provided with a seal ring 109, respectively. Certain waterproof performance can be provided by setting the seal ring. The upper case and the lower case can also be connected to each other and fixed through coming with welding lines and ultrasonic welding.

The working principle of the ratchet wheel lock catch is described in detail below based on FIGS. 2-3:

First, the fixed tooth 1042 of the locking buckle is disengaged from the positioning tooth 1032 of the rotation ratchet wheel after the user presses the release button 105. The steel cable can be pulled out of a certain distance through the buckle.

At the same time, the release button 105 internally contains a check buckle 106. When the release button 105 is pressed, the check buckle 106 fastens the limit-position tooth 1031 on the large rotary tooth to prevent the cable from retracting. In addition, when the release button is pressed, the release button limit-position buckle 107 will fastens the release button 105 to prevent the rotary button from resetting.

And when the release button limit-position buckle 107 is pressed, it will drive the limit-position buckle to rotate around the fixed riveting column under the pressure of the spring. Two teeth at the head of the limit-position buckle is engaged with positioning tooth on the side of the large rotary tooth and the tail of the limit-position buckle pushes the release button to move outwardly. The rotary buckle inside the release button will withdraw along with the release button, and not limit the position of the rotation ratchet wheel.

The rotation ratchet wheel rotates by the driving of internal energy storage springs and begin to put away the steel cable which is connected with the housing through the cable jacket. The buckle is connected with the rotation ratchet wheel through the steel cable.

Wherein the housing and the buckle are fixed by rivets, respectively. The rotation ratchet wheel can rotate and tighten the steel cable when driven by the energy storage spring. Among that, the positioning tooth can fix the position of the rotation ratchet wheel. The limit-position tooth can limit the position of the rotary angle of the rotation ratchet wheel so as to realize the function of fixing the length of the steel cable.

The release button is used to make the locking buckle to be disengaged from the large rotary tooth. The release button limit-position buckle is applied to fasten the release button. The cable jacket is adopted to protect the buckle tightened and plays roles of preventing water and accidental harms to hands.

The cable jacket also plays roles of preventing water and accidental harms to hands To sum up, the control mode of the ratchet wheel lock catch provided by embodiment of this invention is realized by pressing two buttons on the lower side (the adjustable rage of the steel cable is some 200 mm). That is, the control mode of the locking device provided by embodiment of this invention is carried out by pressing buttons, which is different from breaking off, twisting and other operation actions. The pressing action is simple and can be operated by a single hand. The device can be installed conveniently without the need to remove gloves in cold weather with a simple and reliable integral structure, which conforms to use habits of control actions of people.

It can be understood that ordinary technical personnel in the field can replace equivalently or change according to technical programs and conception of this invention. However, the changes or replacement shall be within the scope of the claims appended of this invention.

What is claimed is:

1. An automatic locking device for a snow anti-skid chain, comprising:
    a housing; the housing comprises a first spindle and a second spindle provided perpendicular to a bottom of the housing;
    an energy storage elastic member surrounding the first spindle;
    a rotation ratchet wheel, having an edge comprising limit-position teeth and positioning teeth;
    a release limit-position buckle, linked with the release button; when the release limit-position buckle is pressed downwardly, the release limit-position buckle drives the locking buckle to rotate around the second spindle under pressure of the head spring to engage the fixed tooth at the second end of the locking buckle with a corresponding limit-position tooth at the edge of the rotational ratchet wheel and push the first end of the locking buckle to reset the release button outwardly, thereby withdrawing the rotary buckle from being lammed and stopped in the corresponding positioning tooth along with the release button.

2. The automatic locking device for the snow anti-skid chain of claim 1, wherein the limit-position teeth are provided at an upper half of the rotation ratchet wheel along an axial direction of the rotation ratchet wheel, the positioning teeth are provided at a lower half of the rotation ratchet wheel along the axial direction of the rotation ratchet wheel, and a groove is formed between the limit-position teeth and the positioning teeth.

3. The automatic locking device for the snow anti-skid chain of claim 1, wherein a bottom of the release button is connected with the rotation ratchet wheel through a first compression spring;
    a top end of the rotary buckle is connected with the bottom of the release button through a second compression spring.

4. The automatic locking device for the snow anti-skid chain of claim 1, wherein the through hole of the locking buckle is provided between the first end and the second end of the locking buckle to make the locking buckle rotate around the second spindle.

5. The automatic locking device for the snow anti-skid chain of claim 1, wherein the energy storage elastic member is an energy storage spring hooked by buckles;
both ends of the energy storage spring are against an inner wall of the first spindle and an inner wall of the axle hole, respectively.

6. The automatic locking device for the snow anti-skid chain of claim 1, wherein the housing comprises an upper case and a lower case fixed and connected to each other by riveting columns; the second spindle is one of the riveting columns;
the housing forms a horizontal steel cable outlet tangential to the rotation ratchet wheel.

7. The automatic locking device for the snow anti-skid chain of claim 6, also comprising a steel cable;
one end of the steel cable is fixed in a groove of the rotation ratchet wheel and is wound in the groove to rotate along with the rotation ratchet wheel; and another end of said steel cable extends out from said steel cable outlet.

8. The automatic locking device for the snow anti-skid chain of claim 1, wherein seal rings are provided in the release limit-position buckle and the release button.

\* \* \* \* \*